UNITED STATES PATENT OFFICE 2,366,640

DERIVATIVES OF KETONIC COMPOUNDS

Maurice L. Moore, Nether Providence Township, Delaware County, Pa., assignor to Sharp & Dohme, Incorporated, Philadelphia, Pa., a corporation of Maryland No Drawing. Application August 8, 1941, Serial No. 405,936

16 Claims. (Cl. 260—239.6)

This invention relates to carboxyacyl-aminoarylsulfonamidothiazolones, in which the carboxyacyl group is the radical remaining when the hydroxyl group is removed from only one of the two or more carboxyl groups of a polycarboxylic acid, and the invention covers such products containing the remaining carboxyl group or groups unaltered as well as with the hydrogen in any of such remaining carboxyl groups replaced by a carboxylate-forming element or radical.

The invention of these products comprises the usefulness of this type of product as intestinal antiseptics for combatting and reducing the concentration of organisms causing intestinal infection.

The products of this invention may be represented by the general formula

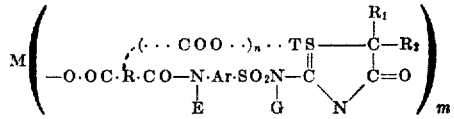

in which M may be hydrogen as well as any other radical capable of combining with a carboxyl radical to form a carboxylate, such as the metals as the alkali metals sodium, potassium, lithium and the like, the alkaline earths as calcium, magnesium, barium and the like, antimony, copper, gold, iron, bismuth and manganese and the like, an alkyl radical, a nitrogen base as ammonium and corresponding radicals of alkyl amines and alkanolamines and the like; and R is the residue of a polycarboxylic acid, aliphatic as well as aromatic, stripped of its carboxyl groups; and T may be hydrogen as well as any of the radicals represented by M and when M is polyvalent T may represent some or all of the valences of M not satisfied by the single carboxyl group to which M is illustrated as being attached; and $n$ may be zero as well as any whole number up to four, whereby the grouping $$\cdots(\cdots COO\cdots)_n\cdots T$$

represents the carboxyl and the carboxylate groups over two from any polycarboxylic acid having more than two carboxyl groups, and $m$ is a small number equal to the valence of M when $n$ is zero and also when each occurrence of radical T is either hydrogen or any other monovalent radical and also when each occurrence of the radical T (whether mono- or poly-valent) is different from the radical M; and since M and T may be separately polyvalent, $m$ may be one when all of the carboxyl groups in the carboxyacyl radical satisfy all of the valences of such polyvalent radicals M and T; and E may be hydrogen as well as an alkyl radical having, for example, from one to about eight or more carbon atoms as well as an aryl radical such as phenyl (unsubstituted as well as substituted); and Ar is an aryl radical (having, as shown in the general formula, a valence linked to nitrogen and a valence linked to sulfur) such as the phenyl (unsubstituted as well as substituted, for example, having nitro, amino, alkyl, carboxyl, sulfonic acid, hydroxy, alkoxy with the alkyl saturated or unsaturated and straight or branched chain, phenyl, halogen such as chlorine, and the like substituents) and naphthyl (similarly unsubstituted as well as substituted) radicals; and G may be hydrogen as well as an alkyl radical, saturated or unsaturated, for example, methyl, ethyl, propyl, butyl, amyl, allyl, hexyl, heptyl, octyl and the like, or decyl, dodecyl, hexadecyl and the like and cyclopentenyl or cyclohexyl, as well as an aralkyl radical as benzyl and the like, as well as an aryl radical as phenyl (unsubstituted as well as substituted as noted for Ar above), naphthyl (similarly unsubstituted as well as substituted) and the like; and $R_1$ and $R_2$ may be separately hydrogen as well as a radical such as an alkyl (straight or branched chain or cyclic) radical, saturated or unsaturated, for example, methyl, ethyl, propyl, butyl, amyl, allyl, hexyl, heptyl, octyl and the like, or decyl, dodecyl, hexadecyl and the like, or cyclopentenyl or cyclohexanyl and the like, as well as an aryl radical as phenyl (substituted as well as unsubstituted as noted for Ar above), tolyl, diphenyl, naphthyl (all similarly unsubstituted as well as substituted), as well as an aralkyl radical as benzyl and the like, or a nitrogen containing radical as nitro and amino (unsubstituted and substituted as acyl- and alkyl-) and an oxygenated radical, for example, hydroxy, alkoxy such as methoxy, ethoxy, propoxy, and carbalkoxy such as carbmethoxy, carboxyl, and halo-alkyl as chlorethyl and the like, and halogen, for example, chlorine and bromine.

The carboxyacyl group (remaining group when the hydroxyl group is removed from only one of the at least two carboxyl groups of a polycarboxylic acid) may be derived from any desirable polycarboxylic acid, for example, aliphatic and aromatic, such as the aliphatic polycarboxylic acids as the saturated aliphatic polycarboxylic acids such as the dicarboxylic acids, oxalic, and malonic acids and their methylene-non-substituted homologues, succinic, glutaric, adipic, pimelic, suberic, azelaic and sebacic acid and the like and derivatives thereof exemplified by malonic acids and its homologues, in any of which at least one of the hydrogens of at least one of the available chain methylene groups is replaced by any desirable substituent, for example, alkyl (saturated as well as unsaturated), hydroxy, amino, carboxyl, and the like. Of such derivatives, the saturated-alkyl-substituted-methylene type is shown by the monoalkyl examples as ethyl-malonic, butyl-malonic, iso-succinic (pyrotartaric or methyl-succinic) and ethyl-succinic acids, and the saturated-dialkyls by dimethylmalonic and diethyl-malonic acids, and the unsaturated-alkyl by allyl-malonic acid. The hydroxy-substituted-methylene type is exemplified by tartronic (hydroxy-malonic) and malic (hydroxy-succinic, in the three isomeric forms) acids and the polyhydroxy-substituted by the dihydroxy type shown by tartaric (dihydroxy-succinic) acid and the tetrahydroxy example in talumucic acid. The amino-substituted-methylene type is demonstrated by aspartic (aminosuccinic) and glutamic acids. The mixed-substituted-methylene type is shown by citramalic (2-hydroxy-2-methyl butanedioic) and citric acids, the latter serving also to point out the carboxylic-substituted-methylene type.

Unsaturated aliphatic dicarboxylic acids from which the carboxyacyl radical is derived correspond to any of the above mentioned saturated examples having at least four carbon atoms and further particularized by maleic and citraconic (methylmaleic) acids and their respective isomers, fumaric and mesaconic (methylfumaric) acids.

Other aliphatic polycarboxylic acids from which the carboxyacyl radical may be derived are the tribasic, saturated as well as unsaturated, acids exemplified respectively by tricarballylic and aconitic acids and derivatives thereof as those in which any of the methylene or chain hydrogens is replaced by any desirable substituent (as pointed out in relation to the dicarboxylic acids) illustrated by citric acid.

The aromatic (aryl) polycarboxylic acids from which the carboxyacyl radical may be derived may be an aryl dicarboxylic acid as well as one containing up to six carboxyl groups, as mellitic acid, and those having replaceable hydrogen atoms may or may not have other substituents on the aromatic nucleus. Those having no substituents on the aromatic nucleus are illustrated by the isomeric phthalic acids, phthalic (ortho), isophthalic (meta) and terephthalic (para). In those having other substituents on the nucleus, such substituents may be illustrated by alkyl (mono- and di-), alkoxy, hydroxy, halo, nitro and other common groups, for example, xylidic (or uvitic, 5-methyl-1,3-dicarboxylicbenzene), cumidic (dimethyl-phthalic), hemipic (dimethoxyphthalic), and coccinic (hydroxy-methylphthalic) acids.

The invention also includes the preparation of these carboxyacylaminoarylsulfonamidothiazolones which are made by heating the desired polycarboxylic acid, its anhydride, or an ester, such as an alkyl ester, or a monohalide, such as the monochloride or a monochloride of the ester, thereof with, for example, the desired aminobenzenesulfonamidothiazolone, either merely together or in an inert reaction medium such as an inert solvent, and as in the latter case separating the desired end product or, as in the case of the use of the ester, liberating the end product by hydrolysis, and in any case, where necessary, subjecting it to purification as by recrystallization. Thus, for example, with the aliphatic dicarboxylic acids having less than four carbon atoms in the chain, the alkyl diester of the dicarboxylic acid is reacted with the aminoarylsulfonamidothiazolone selected. With the aliphatic acids having four and five carbon atoms in the chain and with the aromatic polycarboxylic acids having two carboxyl groups ortho to each other, the desired anhydride is taken as the starting material, while with the aliphatic acids having over five carbon atoms in the chain and with the aromatic acids having no carboxyl group in ortho position to another carboxyl group, the free acid may be heated directly with the selected aminoarylsulfonamidothiazolone. If desired, the monohalide of the ester of any of the acids may be used as the starting material.

The invention may be illustrated by, but not restricted to, the following examples:

*Example 1—2-$N^4$-succinylsulfanilamido-5,5-diethyl-4-thiazolone.*—3.1 grams of succinic anhydride was added to a refluxing solution of 10 grams of 2-sulfanilyl-5,5-diethyl-4-thiazolone in 50 cc. of alcohol. After the addition was complete, the heating under reflux over the hot plate was continued for about five minutes. The reaction solution was then cooled and the alcohol was removed by distillation under vacuum. The residue was triturated with water and filtered. The 2 - $N^4$ - succinylsulfanilamido-5,5-diethyl-4-thiazolone thus obtained, after recrystallization from dilute alcohol melted at 208–209° C.

*Example 2 — 2 - $N^4$ - succinylsulfanilamido - 5-ethyl-4-thiazolone.*—4 grams of succinic anhydride was added slowly to a boiling suspension of 10 grams of 2-sulfanilyl-5-ethyl-4-thiazolone in dioxane and after the addition was completed, the boiling was continued for several minutes. Almost complete solution occurred and the reaction mixture was filtered and chilled whereupon a light precipitate formed. The precipitate then removed by filtration amounted to 4 grams of the desired product. Thereafter about one-half of the dioxane was removed from the filtrate upon distillation under reduced pressure. To the remaining filtrate (after the removal of part of the dioxane) sufficient water was added until no further precipitate was formed. The mixture was filtered yielding an additional 6.9 grams to make a total yield of 10.9 grams of the 2-$N^4$-succinylsulfanilamido-5-ethyl-4-thiazolone, which upon recrystallization from dilute alcohol melted at 161–162° C.

*Example 3—2-$N^4$-maleylsulfanilamido-5-ethyl-4-thiazolone.*—0.9 gram of maleyl anhydride was added to a boiling suspension of 2 grams of 2-sulfanilyl-5-ethyl-4-thiazolone in 50 cc. of alcohol and the boiling was continued for about five minutes when the solution was complete. The reaction solution was then diluted and chilled. The desired 2-$N^4$-maleylsulfanilamido-5-ethyl-4-thiazolone after filtering, upon recrystallization from dilute alcohol, melted with decomposition at 160–165° C.

By replacing the succinic anhydride in Examples 1 and 2, or the maleic anhydride in Example 3, by the equivalent quantity of the possible inner anhydrides of other succinic acid derivatives, such as pyrotartaric, ethyl-succinic, and citraconic acid anhydrides and the like, or by glutaric anhydride, corresponding carboxyacylsulfanilylthiazolones are obtained, for example, 2 - N⁴-pyrotartarylsulfanilamido - 5,5 - diethyl-4-thiazolone,
2-N⁴-pyrotartarylsulfanilamido-5-ethyl-4-thiazolone,
2 - N⁴ - ethylsuccinylsulfanilamido-5,5-diethyl-4-thiazolone,
2 - N⁴ - ethylsuccinylsulfanilamido-5-ethyl-4-thiazolone.
2 - N⁴-citraconylsulfanilamido-5,5-diethyl-4-thiazolone,
2 - N⁴-citraconylsulfanilamido-5-ethyl-4-thiazolone,
2 - N⁴-glutarylsulfanilamido - 5,5 - diethyl-4-thiazolone, and
2-N⁴-glutarylsulfanilamido-5-ethyl-4-thiazolone.

The corresponding carboxyacylaminoarylsulfonamidothiazolones, in which the carboxyacyl radical is derived from an aryl dicarboxylic acid having its carboxyl groups ortho to one another, as phthalic or hemipic acid, are similarly derived by replacing the succinic or maleic anhydride in any of the Examples 1, 2 or 3 by the corresponding equivalent quantity of the anhydride of such aryl dicarboxylic acid, as phthalic or hemipic anhydride, which compounds are obtained as:

2 - N⁴ - phthalylsulfanilamido-5,5-diethyl-4-thiazolone,
2-N⁴-phthalylsulfanilamido-5-ethyl-4-thiazolone,
2-N⁴ - hemipylsulfanilamido-5,5-diethyl-4-thiazolone, and
2-N⁴-hemipylsulfanilamido-5-ethyl-4-thiazolone.

The carboxyacylarylsulfonamidothiazolones, in which the carboxyacyl radical is derived from a polycarboxylic acid having less than four carbon atoms in the aliphatic chain, as oxalic and malonic acids and the mono- and di-alkyl-substituted malonic acids are obtained, for example, by mixing one mole of the desired sulfanilylthiazolone with two moles of a suitable dialkyl ester, such as the diethyl ester, of the desired aliphatic dicarboxylic acid having less than four carbon atoms in the chain, and heating the mixture on a hot plate at between about 130 to about 150° C. for about two hours, with occasional stirring, and at the end of that time, washing the reaction mixture thoroughly with dilute hydrochloric acid and water. The ethyl ester of, for example, 2-N⁴-oxalylsulfanilamido-4-thiazolone thus obtained is then placed, for example, in about 150 cc. of an about 2.5% solution of ammonium hydroxide (for about every 15 grams of said ester) and heated on the hot plate for at least about one-half hour and between about 95 to 100° C., after which the solution is decolorized with charcoal ("Darco") and made slightly acid by the addition of concentrated hydrochloric acid, yielding 2-N⁴ - oxalylsulfanilamido-4-thiazolone. Similarly, there are obtained.

2-N⁴-oxalylsulfanilamido-5-ethyl-4-thiazolone,
2-N⁴-oxalylsulfanilamido - 5,5-diethyl-4-thiazolone
2-N⁴-malonylsulfanilamido-4-thiazolone,
2-N⁴-malonylsulfanilamido-5-ethyl-4-thiazolone and
2-N⁴-malonylsulfanilamido-5,5-diethyl- 4-thiazolone By replacing the ethyl malonate employed to thus obtain the last three compounds by an equivalent amount of a suitable dialkyl ester, such as the diethyl ester, of any of the alkyl (saturated as well as unsaturated) derivatives of malonic acid, as ethylmalonic, butylmalonic, dimethylmalonic, diethylmalonic and allylmalonic acids and the like, by similar procedure there will be obtained the corresponding 2 - N⁴ - alkylmalonylsulfanilamidothiazolones, for example, 2-N⁴-ethylmalonylsulfanilamido-4-thiazolone,
2-N⁴-dimethylmalonylsulfanilamido - 5 - ethyl-4-azolone,
2-N⁴-ethylmalonylsulfanilamido - 5,5 - diethyl-4-thiazolone,
2-N⁴-butylmalonylsulfanilamido-4-thiazolone,
2-N⁴-butylmalonylsulfanilamido-5-ethyl-4-thiazolone,
2-N⁴-butylmalonylsulfanilamido - 5,5 - diethyl-4-thiazolone,
2-N⁴-dimethylmalonylsulfanilamido-4-thiazolone,
2-N⁴-dimethylmalonylsulfanilamido - 5 - ethyl-4-thiazolone,
2-N⁴-dimethylmalonylsulfanilamido - 5,5-diethyl-4-thiazolone,
2-N⁴-diethylmalonylsulfanilamido-4-thiazolone,
2-N⁴-diethylmalonylsulfanilamido - 5 - ethyl-4-thiazolone,
2-N⁴-diethylmalonylsulfanilamido - 5,5 - diethyl-4-thiazolone,
2-N⁴-allylmalonylsulfanilamido-4-thiazolone,
2-N⁴-allylmalonylsulfanilamido - 5-ethyl-4-thiazolone, and
2-N⁴-allylmalonylsulfanilamido - 5,5 - diethyl-4-thiazolone.

Similarly, by replacing the ethyl malonate by the equivalent quantity of a similar ester of tartronic acid, there is obtained 2-N⁴-tartronylsulfanilamido-4-thiazolone, 2-N⁴-tartronylsulfanilamido-5-ethyl-4-thiazolone, and 2-N⁴-tartronylsulfanilamido-5,5-diethyl-4-thiazolone.

The corresponding carboxyacylaminoarylsulfanilamidothiazolones derived from the transform succinic acid derivatives may be obtained by replacing the ethyl oxalate or malonate in the method above described for the reaction with oxalic and malonic acids, by an equivalent quantity of a corresponding monochloride-ester of such succinic acid derivative or unsaturated isomer, and with little or no heating, for example, with the equivalent quantity of the monochloride of the ethyl ester of, for example, fumaric or mesaconic acid, among which compounds of the invention are 2-N⁴-fumarylsulfanilamido-4-thiazolone,
2-N⁴-fumarylsulfanilamido-5-ethyl-4-thiazolone,
2-N⁴-fumarylsulfanilamido-5,5-diethyl-4-thiazolone,
2-N⁴-mesaconylsulfanilamido-4-thiazolone,
2-N⁴-mesaconylsulfanilamido - 5-ethyl-4-thiazolone, and
2-N⁴-mesaconylsulfanilamido - 5,5-diethyl-4-thiazolone.

The carboxyacylaminoarylsulfonamidothiazolones in which the carboxyacyl radical is derived from an aliphatic polycarboxylic acid having more than five carbon atoms in the chain, or is derived from an aromatic polycarboxylic acid having no carboxyl group in ortho position to another such group, are obtained, for example, by mixing equimolecular quantities of the desired sulfanilylthiazolone and the desired polycarboxylic acid and heating the mixture at between about 135–155° C. for about an hour and then treating the reaction product in about one or one and one-half liters per mole of acid used of an about 10% solution of ammonium hydroxide to separate the insoluble, undesired by-products. The latter are then filtered off and the filtrate is neutralized with dilute hydrochloric acid yielding the desired carboxyacylaminoarylsulfonamido-thiazolone which may, if desired, be purified by redissolving in dilute ammonia and slowing precipitating with dilute hydrochloric acid. Such compounds and those obtainable from the amino- and hydroxy-substituted derivatives of succinic acid are illustrated by 2-$N^4$-adipylsulfanilamido-4-thiazolone,
2-$N^4$-adipylsulfanilamido-5-ethyl-4-thiazolone,
2-$N^4$-adipylsulfanilamido - 5,5 - diethyl-4-thiazolone,
2-$N^4$-pimelylsulfanilamido-4-thiazolone,
2-$N^4$-pimelylsulfanilamido-5-ethyl-4-thiazolone,
2-$N^4$-pimelylsulfanilamido-5,5 - diethyl-4-thiazolone,
2-$N^4$-suberylsulfanilamido-4-thiazolone,
2-$N^4$-suberylsulfanilamido-5-ethyl-4-thiazolone,
2-$N^4$-suberylsulfanilamido - 5,5-diethyl-4-thiazolone,
2-$N^4$-azelaylsulfanilamido-4-thiazolone,
2-$N^4$-azelaylsulfanilamido-5-ethyl-4-thiazolone,
2-$N^4$-azelaylsulfanilamido-5,5 - diethyl-4-thiazolone,
2-$N^4$-sebacylsulfanilamido-4-thiazolone,
2-$N^4$-sebacylsulfanilamido-5-ethyl-4-thiazolone,
2-$N^4$-sebacylsulfanilamido - 5,5-diethyl-4-thiazolone,
2-$N^4$-isophthalylsulfanilamido-4-thiazolone,
2-$N^4$-isophthalylsulfanilamido - 5-ethyl-4-thiazolone,
2-$N^4$-isophthalylsulfanilamido-5,5-diethyl-4-thiazolone,
2-$N^4$-terephthalylsulfanilamido-4-thiazolone,
2-$N^4$-terephthalylsulfanilamido-5-ethyl-4-thiazolone,
2-$N^4$-terephthalylsulfanilamido - 5,5 - diethyl-4-thiazolone,
2-$N^4$-xylidylsulfanilamido-4-thiazolone,
2-$N^4$-xylidylsulfanilamido-5-ethyl-4-thiazolone,
2-$N^4$-xylidylsulfanilamido - 5,5-diethyl-4-thiazolone,
2-$N^4$-cumidylsulfanilamido-4-thiazolone,
2-$N^4$-cumidylsulfanilamido-5-ethyl-4-thiazolone,
2-$N^4$-cumidylsulfanilamido-5,5-diethyl-4-thiazolone,
2-$N^4$-malylsulfanilamido-4-thiazolone,
2-$N^4$-malylsulfanilamido-5-ethyl-4-thiazolone,
2-$N^4$-malylsulfanilamido - 5,5 - diethyl-4-thiazolone,
2-$N^4$-aspartylsulfanilamido-4-thiazolone,
2-$N^4$-aspartylsulfanilamido-5-ethyl-4-thiazolone,
2-$N^4$-aspartylsulfanilamido-5,5-diethyl-4-thiazolone,
2-$N^4$-citramalylsulfanilamido-4-thiazolidone,
2-$N^4$-citramalylsulfanilamido - 5-ethyl-4-thiazolone,
2-$N^4$-citramalylsulfanilamido - 5,5-diethyl-4-thiazolone,
2-$N^4$-tartarylsulfanilamido-4-thiazolone,
2-$N^4$-tartarylsulfanilamido-5-ethyl-4-thiazolone,
2-$N^4$-tartarylsulfanilamido-5,5-diethyl-4-thiazolone.

Similarly, there are obtained:

2-$N^4$-citrylsulfanilamido-4-thiazolone,
2-$N^4$-citrylsulfanilamido-5-ethyl-4-thiazolone,
2-$N^5$-citrylsulfanilamido-5,5-diethyl-4-thiazolone,
2-$N^4$-glutamylsulfanilamido-4-thiazolone,
2-$N^4$-glutamylsulfanilamido - 5 - ethyl-4-thiazolone,
2-$N^4$-glutamylsulfanilamido-5,5-diethyl-4-thiazolone,
2-$N^4$-talomucylsulfanilamido-4-thiazolone,
2-$N^4$-talomucylsulfanilamido - 5-ethyl-4-thiazolone,
2-$N^4$-talomucylsulfanilamido - 5,5,-diethyl-4-thiazolone,
2-$N^4$-tricarballylsulfanilamido-4-thiazolone,
2-$N^4$-tricarballylsulfanilamido - 5-ethyl-4-thiazolone,
2-$N^4$-tricarballylsulfanilamido-5,5-diethyl-4-thiazolone,
2-$N^4$-aconitylsulfanilamido-4-thiazolone,
2-$N^4$-aconitylsulfanilamido-5-ethyl-4-thiazolone,
2-$N^4$-aconitylsulfanilamido-5,5-diethyl-4-thiazolone,
2-$N^4$-mellitylsulfanilamido-4-thiazolone,
2-$N^4$-mellitylsulfanilamido-5-ethyl-4-thiazolone,
2-$N^4$-mellitylsulfanilamido-5,5 - diethyl-4-thiazolone,
2-$N^4$-coccinylsulfanilamido-4-thiazolone,
2-$N^4$-coccinylsulfanilamido-5-ethyl-4-thiazolone,
2-$N^4$-coccinylsulfanilamido-5,5-diethyl-4-thiazolone,
2-$N^4$-(4-hydroxy-3-carboxyl - benzoyl)-sulfanilamido-4-thiazolone,
2-$N^4$-(4-hydroxy-3-carboxyl - benzoyl)-sulfanilamido-5-ethyl-4-thiazolone, and
2-$N^4$-(4-hydroxy-3-carboxyl - benzoyl)-sulfanilamido-5,5-diethyl-4-thiazolone.

Furthermore, by replacing the 2-sulfanilamido-5-ethyl-4-thiazolone in any of the examples and in any of the modifications of the examples as just hereinabove and hereinbelow included in the various paragraphs following the last example, by 2-sulfanilamido-4-thiazolone or by any thiazolone-nuclearly (in the 5-position) substituted aminophenylsulfonamido - 4 - thiazolone having any of the substituents of the type represented by $R_1$ and $R_2$ in the general formula of the products of this invention, there are obtained the corresponding carboxyacylsulfanilamido-4-thiazolone and carboxyacylsulfanilamido-4-thiazolones in which there are one or two substituents in the 5-position on the thiazolone-nucleus. Thus, by varying the aminoarylsulfonamido-4-thiazolone or the sulfanilamido-4-thiazolone starting material and employing corresponding materials in which the thiazolone-nucleus is either non-substituted or substituted as just above indicated, there are obtained:

2-$N^4$-succinylsulfanilamido-4-thiazolone,
2-(o-succinylaminobenzene) - sulfonamido-4-thiazolone,
2-(m-succinylaminobenzene)-sulfonamido-4-thiazolone,
2-$N^4$-succinylsulfanilamido-5 - methyl-4-thiazolone,
2-$N^4$-succinylsulfanilamido - 5 - propyl-4-thiazolone,
2-$N^4$-succinylsulfanilamido-5-butyl-4-thiazolone,
2-$N^4$-succinylsulfanilamido-5-amyl-4-thiazolone,
2-$N^4$-succinylsulfanilamido-5-cetyl-4-thiazolone,
2-$N^4$-succinylsulfanilamido-5-dimethyl-4-thiazolone,
2-$N^4$-succinylsulfanilamido - 5 - ethoxy-4-thiazolone,
2-$N^4$-succinylsulfanilamido-5-allyl-4-thiazolone,
2-$N^4$-succinylsulfanilamido - 5 - cyclo-hexenyl-4-thiazolone,
2-$N^4$-succinylsulfanilamido-5 - cyclo-hexyl-4-thiazolone, and
2-$N^4$-succinylsulfanilamido - 5 - benzyl-4-thiazolone, and
2-$N^4$-succinylsulfanilamido - 5 - phenyl-4-thiazolone.

To obtain the compounds of the invention in which G of the general formula is a positive radical of the type hereinabove disclosed for G, the aminoarylsulfonamidothiazolone starting material employed to produce the thiazolone or thiazolone-nuclearly substituted compounds of the invention as shown above is alkylated or aralkylated or arylated by reaction with the necessary suitable alkylating, aralkylating or arylating agent to attach to the sulfonamido nitrogen the desired positive radical. Alkylating agents such as an alkyl halide, as methyl chloride or ethyl chloride or bromide, or an alkyl sulfate as an alkyl sulfonate, and the like, may be employed to replace the hydrogen represented by G by the desired alkyl radical, and by using the corresponding aralkylating or arylating agent, by the desired aralkyl or aryl radical. By reacting the thus obtained aminobenzenesulfonalkyl-, aralkyl-, or aryl-amido-4-thiazolone with the desired polycarboxylic acid, or anhydride or ester thereof, there is obtained any desired product of the invention having a positive radical other than hydrogen for the element G in the general formula, for example, the 2-N⁴-carboxyacylaminobenzenesulfonalkylamidothiazolones as: 2-N⁴-succinylsulfanilylmethylamido-4-thiazolone, 2 - N⁴ - succinylsulfanilylethylamido-4-thiazolone, or similar 2-carboxyacylsulfanilylaralkylamido-, or aryl-amidothiazolones as 2-N⁴-succinylsulfanilylbenzylamidothiazolone, and 2-N⁴-succinylsulfanilylphenylamido-thiazolone.

By replacing the succinyl, the carboxyacyl, group in any of the above compounds including also the thiazolone-nuclearly substituted, as well as the N¹-substituted compounds of the invention, by the carboxyacyl radical derived from any other polycarboxylic acid of the type hereinabove disclosed, by employing any suitable one of the above described procedures, the corresponding compound of the invention with the corresponding different carboxyacyl radical is obtained. Also, by replacing the 2-(aminobenzenesulfonamido)-4-thiazolone or nuclearly-substituted thiazolone as a reactant in any of these procedures, there is obtained the corresponding carboxyacylaminoarylsulfonamido-4-thiazolone containing any desired carboxyacyl radical of the type herein indicated as well as any N¹-substituent or any one or two desired substituents in the 5-position on the thiazolone-nucleus.

From the various exemplifications of the compounds of the invention, there is seen that they may be generally referred to as carboxyacylaminoarylsulfonyl derivatives of aminothiazolones, in which the thiazolone portion, as indicated by the thiazolone nucleus and the elements R₁ and R₂ in the general formula, is referred to generally as "thiazolones" to embrace not only those compounds in which the thiazolone radical is derived from 4-thiazolone itself, but also those in which the thiazolone portion is derived from the 4-thiazolone nucleus mono- or di-substituted in the 5-position, and in which derivatives, the amino radical through which the thiazolone portion is attached to the sulfur, is either unsubstituted or substituted by a positive radical.

The products of the invention, in which M and T of the general formula are hydrogen are generally practicably water soluble, are usually neutral compounds, which become very substantially soluble in water when the free carboxyl group or groups in the product is converted to the carboxylate form by the use of the equivalent amount of ammonium hydroxide or an amine or alkanolamine or of sodium bicarbonate. Thus, the compounds in which M and T are hydrogen may exhibit a solubility in water within about five or up to about ten per cent, whereas the carboxylate form of the same compound may have a solubility up to about fifty per cent and even higher.

The carboxylate form of any of the compounds of the invention may be prepared, for example, by adding to a small amount of water an excess of the compound over its solubility in water and dissolving the excess by stirring in a sufficient quantity of, for example, anhydrous sodium bicarbonate. The solution is preferably filtered and from the filtrate the highly soluble sodium salt can be isolated, for example, by adding an equal volume of alcohol and pouring the resulting solution into about 10 volumes of acetone. The substance thrown out of solution is permitted to settle and the supernatant liquid withdrawn and the residue preferably treated several times with fresh acetone. After decanting the acetone from the last treatment, the resulting desired sodium salt may be dried preferably under vacuum.

Other metal carboxylate salts of the compounds such as the copper, gold, iron and bismuth salts and the like may be obtained by reacting the alkali metal salt, preferably in aqueous solution, with a suitable soluble salt of the metal, the carboxylate salt of which is desired. The desired carboxylate salt is obtained by resulting double decomposition.

Among the various products of the invention, it has been found that those in which the carboxyacylamino radical is para in position to the sulfonamido radical possess particularly desirable properties especially insofar as intestinal antisepsis is concerned.

These compounds, applicable as intestinal antiseptics, exhibit such activity by the attachment to the various nuclear portions of the compound, of substituents the introduction of which into the basic nuclei leaves the compound substantially non-toxic. Similarly, the metallic element in the compounds used as intestinal antiseptics are such that their inclusion in the compound introduces no toxic characteristic.

In general, the carboxyacylsulfanilyl derivatives of the aminothiazolones, in which the carboxyacyl radical is aliphatic and contains four carbon atoms in the aliphatic chain, are especially effective as such intestinal antiseptics for it is possible to build up a high concentration of them in the intestinal tract and without a simultaneously high blood level and yet with substantially no noticeable indication of toxic symptoms. Among these particularly effective compounds are not only those in which the aliphatic chain is saturated, such as those in which the carboxyacyl radical is derived from succinic, malic (the three isomeric forms), aspartic, citramaleic, pyrotartaric, ethylsuccinic, tartaric and ketosuccinic acids and their substituted derivatives, but also those in which the aliphatic chain is unsaturated, such as those in which the carboxyacyl radical is obtained from maleic, citraconic, fumaric and mesaconic acids and their substituted derivatives. The N⁴-carboxyacyl products of the invention show distinctive activity.

The various compounds, used as intestinal antiseptics, are administered orally, either in the form of tablets, capsules or powders of the solid material or as solutions of any desired concentration, exceeding, if desired, 50%.

In the specification and claims the carboxyacyl radical, as hereinabove defined, derived from specific polycarboxylic acids herein named, is designated by replacing the terminal "-ic" in the name of the acid by the ending "-yl" as, for example, the succinyl, oxalyl, malonyl, phthalyl, maleyl, adipyl, glutaryl, aspartyl, tartaryl, fumaryl, mesaconyl, and citryl carboxyacyl radicals and the like, derived respectively from succinic, oxalic, malonic, phthalic, maleic, adipic, glutaric, aspartic, tartaric, fumaric, mesaconic, and citric acids and the like.

The term "benzene" as used in the specification and claims, for example, in the expression "2-(carboxyacylaminobenzenesulfonamido)-4-thiazolones" covers the divalent residue —$C_6H_4$—, to one free valence of which the carboxyacylamino group is linked and to the other free valence of which the sulfur of the sulfonyl group is attached so that there are only those two substituents on the benzene ring. On the other hand, the term "phenyl" as used in this specification and claims, for example, in "2-(carboxyacylaminophenylsulfonamido)-4-thiazolones" is generic and includes this divalent residue —$C_6H_4$— as just hereinabove defined with respect to the term benzene (otherwise referred to as the non-substituted-phenyl divalent group), as well as to the substituted phenyl nucleus in which one or more of the remaining four hydrogen atoms may be replaced by an additional substituent on the ring.

The expression "carboxylates" employed in any of the claims embraces those groups resulting from replacing the hydrogen of a carboxyl group with any other grouping capable of combining with a carboxyl radical to form a carboxylate such as the various metals and the like, or an alkyl radical or a nitrogen base and the like of the type hereinabove described at page 1, column 1, lines 27 through 34, and prepared in the manner hereinabove described beginning at page 5, column 2, line 8 and running through line 32.

I claim:

1. 2 - (N⁴ - carboxyacylaminophenylsulfonamido)-4-thiazolones, in which the thiazolone nucleus is substituted at the 5-position.

2. 2 - (N⁴ - carboxyacylaminophenylsulfonamido)-4-thiazolones, in which the carboxyacyl group is aliphatic.

3. 2 - (N⁴ - carboxyacylaminophenylsulfonamido)-4-thiazolones, in which the carboxyacyl group is saturated aliphatic.

4. 2 - (N⁴ - carboxyacylaminophenylsulfonamido)-4-thiazolones, in which the carboxyacyl group is aliphatic and has four carbon atoms in its chain.

5. 2-N⁴-succinylsulfanilamido-5-ethyl-4-thiazolone.

6. 2-N⁴-succinylsulfanilamido-4-thiazolone.

7. 2 - (N⁴ - carboxyacylaminophenylsulfonamido)-4-thiazolones, in which the carboxyacyl group is substituted aliphatic.

8. 2 - (N⁴ - carboxyacylaminophenylsulfonamido)-4-thiazolones, in which the carboxyacyl group is hydroxy-substituted aliphatic.

9. 2-N⁴-malylsulfanilamido-4-thiazolone.

10. 2 - (carboxyacylaminoarylsulfonamido) - 4-thiazolones.

11. 2-(carboxyacylaminobenzenesulfonamido)-4-thiazolones.

12. 2-(N⁴ - carboxyacylaminophenylsulfonamido)-4-thiazolones.

13. 2-(N⁴-carboxyacylaminobenzenesulfonamido)-4-thiazolones.

14. 2-(N⁴ - succinylaminophenylsulfonamido)-4-thiazolones.

15. 2 -(N⁴ - malylaminophenylsulfonamido)-4-thiazolones.

16. At least one 2-(carboxyacylaminophenylsulfonamido)-4-thiazolone, prepared for use as a therapeutic, of the group consisting of those of the formula

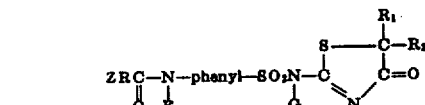

and the carboxylates thereof, in which ZR is a carboxyl containing group linked to the C=O by a carbon atom of the radical R; R is the residue of a polycarboxylic acid stripped of its carboxyl groups; E and G are each separately and independently a member of the class consisting of hydrogen, alkyl, aralkyl and aryl radicals; and the thiazolone ring together with the elements $R_1$ and $R_2$ attached to the 5-carbon on the ring represents a member of the class consisting of the thiazolone and nuclearly substituted thiazolone radicals.

MAURICE L. MOORE.

---

CERTIFICATE OF CORRECTION.

Patent No. 2,366,640.  January 2, 1945.

MAURICE L. MOORE.

It is hereby certified that error appears in the printed specification of the above numbered patent requiring correction as follows: Page 3, first column, line 8, after the syllable "azolone" strike out the period and insert instead a comma; line 62, after "lone" and line 64, after "thiazolone" insert a comma; line 59, same page and column, after "obtained" strike out the period and insert the same after "lone" in line 67; page 3, second column, line 5, for "2-N⁴-dimethylmalonylsulfanilamido-5-ethyl-4-azolone." read --2-N⁴-ethylmalonylsulfanilamido-5-ethyl-4-thiazolone--; and that the said Letters Patent should be read with this correction therein that the same may conform to the record of the case in the Patent Office.

Signed and sealed this 10th day of July, A. D. 1945.

Leslie Frazer (Seal)  Acting Commissioner of Patents.

In the specification and claims the carboxyacyl radical, as hereinabove defined, derived from specific polycarboxylic acids herein named, is designated by replacing the terminal "-ic" in the name of the acid by the ending "-yl" as, for example, the succinyl, oxalyl, malonyl, phthalyl, maleyl, adipyl, glutaryl, aspartyl, tartaryl, fumaryl, mesaconyl, and citryl carboxyacyl radicals and the like, derived respectively from succinic, oxalic, malonic, phthalic, maleic, adipic, glutaric, aspartic, tartaric, fumaric, mesaconic, and citric acids and the like.

The term "benzene" as used in the specification and claims, for example, in the expression "2-(carboxyacylaminobenzenesulfonamido)-4-thiazolones" covers the divalent residue —$C_6H_4$—, to one free valence of which the carboxyacylamino group is linked and to the other free valence of which the sulfur of the sulfonyl group is attached so that there are only those two substituents on the benzene ring. On the other hand, the term "phenyl" as used in this specification and claims, for example, in "2-(carboxyacylaminophenylsulfonamido)-4-thiazolones" is generic and includes this divalent residue —$C_6H_4$— as just hereinabove defined with respect to the term benzene (otherwise referred to as the non-substituted-phenyl divalent group), as well as to the substituted phenyl nucleus in which one or more of the remaining four hydrogen atoms may be replaced by an additional substituent on the ring.

The expression "carboxylates" employed in any of the claims embraces those groups resulting from replacing the hydrogen of a carboxyl group with any other grouping capable of combining with a carboxyl radical to form a carboxylate such as the various metals and the like, or an alkyl radical or a nitrogen base and the like of the type hereinabove described at page 1, column 1, lines 27 through 34, and prepared in the manner hereinabove described beginning at page 5, column 2, line 8 and running through line 32.

I claim:

1. 2 - (N⁴ - carboxyacylaminophenylsulfonamido)-4-thiazolones, in which the thiazolone nucleus is substituted at the 5-position.

2. 2 - (N⁴ - carboxyacylaminophenylsulfonamido)-4-thiazolones, in which the carboxyacyl group is aliphatic.

3. 2 - (N⁴ - carboxyacylaminophenylsulfonamido)-4-thiazolones, in which the carboxyacyl group is saturated aliphatic.

4. 2 - (N⁴ - carboxyacylaminophenylsulfonamido)-4-thiazolones, in which the carboxyacyl group is aliphatic and has four carbon atoms in its chain.

5. 2-N⁴-succinylsulfanilamido-5-ethyl-4-thiazolone.

6. 2-N⁴-succinylsulfanilamido-4-thiazolone.

7. 2 - (N⁴ - carboxyacylaminophenylsulfonamido)-4-thiazolones, in which the carboxyacyl group is substituted aliphatic.

8. 2 - (N⁴ - carboxyacylaminophenylsulfonamido)-4-thiazolones, in which the carboxyacyl group is hydroxy-substituted aliphatic.

9. 2-N⁴-malylsulfanilamido-4-thiazolone.

10. 2 - (carboxyacylaminoarylsulfonamido) - 4-thiazolones.

11. 2-(carboxyacylaminobenzenesulfonamido)-4-thiazolones.

12. 2-(N⁴ - carboxyacylaminophenylsulfonamido)-4-thiazolones.

13. 2-(N⁴-carboxyacylaminobenzenesulfonamido)-4-thiazolones.

14. 2-(N⁴ - succinylaminophenylsulfonamido)-4-thiazolones.

15. 2 -(N⁴ - malylaminophenylsulfonamido)-4-thiazolones.

16. At least one 2-(carboxyacylaminophenylsulfonamido)-4-thiazolone, prepared for use as a therapeutic, of the group consisting of those of the formula

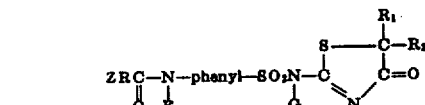

and the carboxylates thereof, in which ZR is a carboxyl containing group linked to the C=O by a carbon atom of the radical R; R is the residue of a polycarboxylic acid stripped of its carboxyl groups; E and G are each separately and independently a member of the class consisting of hydrogen, alkyl, aralkyl and aryl radicals; and the thiazolone ring together with the elements $R_1$ and $R_2$ attached to the 5-carbon on the ring represents a member of the class consisting of the thiazolone and nuclearly substituted thiazolone radicals.

MAURICE L. MOORE.

---

CERTIFICATE OF CORRECTION.

Patent No. 2,366,640. January 2, 1945.

MAURICE L. MOORE.

It is hereby certified that error appears in the printed specification of the above numbered patent requiring correction as follows: Page 3, first column, line 8, after the syllable "azolone" strike out the period and insert instead a comma; line 62, after "lone" and line 64, after "thiazolone" insert a comma; line 59, same page and column, after "obtained" strike out the period and insert the same after "lone" in line 67; page 3, second column, line 5, for "2-N⁴-dimethylmalonylsulfanilamido-5-ethyl-4-azolone," read --2-N⁴-ethylmalonylsulfanilamido-5-ethyl-4-thiazolone--; and that the said Letters Patent should be read with this correction therein that the same may conform to the record of the case in the Patent Office.

Signed and sealed this 10th day of July, A. D. 1945.

(Seal)

Leslie Frazer

Acting Commissioner of Patents.